United States Patent [19]

Czerepinski et al.

[11] Patent Number: 4,713,412
[45] Date of Patent: Dec. 15, 1987

[54] EMULSION POLYMERIZED SEC-BUTYL ACRYLATE LATEXES SUITABLE FOR USE AS PRESSURE SENSITIVE ADHESIVES

[75] Inventors: Ralph G. Czerepinski, Midland; Roland E. Gunderman, Clare, both of Mich.

[73] Assignee: The Dow Chemical Company, Midland, Mich.

[21] Appl. No.: 762,083

[22] Filed: Aug. 2, 1985

[51] Int. Cl.$^4$ .................. C08L 31/00; C08L 33/00; C08L 35/00

[52] U.S. Cl. .................. 524/833; 526/328; 526/328.5; 428/461; 428/475.8; 428/483; 428/511

[58] Field of Search .............. 524/833; 526/328, 328.5

[56] References Cited

U.S. PATENT DOCUMENTS

| | | | |
|---|---|---|---|
| 2,117,349 | 5/1938 | Neher | 526/328 |
| 2,129,663 | 9/1938 | Barrett | 526/328 |
| 2,136,404 | 11/1938 | Wheeler | 526/328 |
| 2,400,477 | 5/1946 | Atwood | 526/328 |
| 2,445,925 | 7/1948 | Rehberg et al. | 526/328 |
| 3,067,154 | 12/1962 | Sterling | 526/328.5 |
| 3,174,959 | 3/1965 | Ferington | 526/328 |
| 3,177,186 | 4/1965 | Miller | 526/328 |
| 3,691,140 | 9/1972 | Silver | 526/271 |
| 4,045,399 | 8/1977 | Suzuki et al. | 524/833 |
| 4,189,419 | 2/1980 | Takemoto et al. | 524/272 |

FOREIGN PATENT DOCUMENTS

| | | | |
|---|---|---|---|
| EP156210 | 10/1985 | European Pat. Off. | 526/328 |
| 3233840 | 3/1984 | Fed. Rep. of Germany | 524/833 |

*Primary Examiner*—Ronald W. Griffin

[57] ABSTRACT

An emulsion polymerized latex composition suitable for use as a pressure sensitive adhesive having from about 90 to about 99.5 percent by total weight polymer of sec-butyl acrylate and from about 10 to about 0.5 percent by total weight polymer prepared from monomers selected from the group consisting of alkyl esters of acrylic and methacrylic acids wherein the alkyl chain has up to about 20 carbon atoms, monovinylidene aromatics, and ethylenically unsaturated carboxylic acids. Additionally the latex composition can include from about 1 to about 90 percent by weight on a total solids basis of a tackifying resin. Adhesives prepared with the subject latex compositions provide an excellent balance of adhesive properties, i.e., peel and shear adhesion.

3 Claims, No Drawings

EMULSION POLYMERIZED SEC-BUTYL ACRYLATE LATEXES SUITABLE FOR USE AS PRESSURE SENSITIVE ADHESIVES

BACKGROUND OF THE INVENTION

The present invention relates to aqueous emulsion polymerized latexes having a predominant proportion of sec-butyl acrylate suitable for use as pressure sensitive adhesives and to articles comprising surfaces coated with such pressure sensitive adhesive polymers.

As used in the art, the term "pressure sensitive adhesive" designates a polymeric material which in solvent-free form is aggressively and permanently tacky at room temperature, and will firmly adhere to a variety of dissimilar surfaces upon mere contact without the need of more than finger or hand pressure. It is generally desirable that, in order that the pressure sensitive adhesive adhere well, the critical surface energy of the polymeric material be as low as possible. Typically, low critical surface energies are associated with highly nonpolar polymers.

Pressure sensitive adhesives are conventionally used in the form of films which provide adhesive bonds between normally nonadhering surfaces. The films have been prepared by casting from organic solvent solutions of pressure sensitive interpolymers and evaporating the solvent. A disadvantage of such organic solutions arises from large quantities of organic solvent effluent which is discharged into the atmosphere. Manufacturers of pressure sensitive articles are, therefore, switching increasingly from organic solutions to aqueous emulsions of pressure sensitive interpolymers to minimize atmospheric pollution. Aqueous emulsions of essentially water-insoluble polymers are applied to surfaces to yield pressure sensitive adhesive coatings.

The most important properties recognized by the pressure sensitive adhesive industry are adhesion or peel strength; "tack"; and resistance to shear at elevated temperatures. The addition of a tackifier can improve the peel strength and adhesion exhibited by a pressure sensitive adhesive at room temperature. Unfortunately, at higher temperatures most tackifiers serve as plasticizers and promote shear failures.

A balance of desirable properties can be achieved by preparing a copolymer comprising varying amounts of "soft" monomer (i.e., having a glass transition temperature below 25° C.) and "hard" monomer (i.e., having a glass transition temperature above 25° C.). For example, large amounts of "soft" monomers such as butadiene, i-butyl acrylate, n-butyl acrylate, t-butyl acrylate or 2-ethylhexyl acrylate in a copolymer improve the adhesive strengths of the resulting pressure sensitive adhesives, but at the expense of thermal shear endurance. Conversely, the polymers comprising large amounts of "hard" monomers will exhibit good thermal shear endurance at the expense of tack and adhesive properties.

The use of alkyl acrylic esters in preparing polymers and copolymers which are then employed as pressure sensitive adhesives is disclosed in U.S. Pat. No. 3,691,140. However, U.S. Pat. No. 3,691,140 only discloses acrylic ester polymers prepared by aqueous suspension polymerization as being suitable for tacky, infusible microspheres. It has not been documented that sec-butyl acrylate has superior properties when employed in preparing pressure sensitive adhesives with respect to other alkyl acrylic esters.

In view of the fact that the pressure sensitive adhesives which have been documented to date have been prepared through balancing properties such as cohesion, adhesion and high temperature shear resistance, it would be highly desirable to provide a polymer which can be employed as an aqueous emulsion which has a low critical surface energy and which exhibits extremely high cohesion and adhesion without the loss of high temperature shear resistance.

SUMMARY OF THE INVENTION

The present invention is an emulsion polymerized latex suitable for use as a pressure sensitive adhesive (PSA) comprising from about 90 to about 99.5 percent by weight total polymer of sec-butyl acrylate and from about 10 to about 0.5 percent by weight total polymer prepared from monomers selected from the group consisting of alkyl esters of acrylic and methacrylic acids, wherein the alkyl chain has up to about 20 carbon atoms, monovinylidene aromatics and ethylenically unsaturated carboxylic acids.

In one embodiment, the minor portion is ethylenically unsaturated carboxylic acids such as itaconic or acrylic acid. In another embodiment, the sec-butyl acrylate polymer portion comprises from about 95 to about 97 percent by weight total polymer. In yet another embodiment, the composition additionally comprises a tackifying resin from about 1 to about 90 percent by weight on a total solids basis, more preferably from about 30 to about 50 percent by weight on a total solids basis.

The excellent adhesive characteristics of the present emulsion polymerized latex composition make it particularly suitable for use as a pressure sensitive adhesive (PSA). In particular, an excellent balance of shear bond and peel adhesion is provided by polymers comprising predominantly sec-butyl acrylate.

DETAILED DESCRIPTION OF THE INVENTION

The critical monomer which is employed to prepare the pressure sensitive adhesives of this invention is sec-butyl acrylate. Typically, the monomer is prepared by reacting sec-butyl alcohol with acrylic acid.

Other monomers which are commonly employed in preparing pressure sensitive adhesives are also suitable in preparing the pressure sensitive adhesives of this invention. Typical are those alkyl esters of acrylic and methacrylic acids wherein the alkyl chains contain up to about 20 carbon atoms. Common examples include iso-butyl acrylate, 2-ethylhexyl acrylate, iso-octyl acrylate, n-dodecyl acrylate, 2-methylbutyl acrylate, methyl methacrylate, ethyl acrylate, and the like.

Other monomers which are commonly employed in preparing pressure sensitive adhesives, and which are useful herein include, for example, the monovinylidene aromatics such as styrene, α-methylstyrene and vinyl toluene; the α-olefins and diolefins such as ethylene, propylene, butene-1, hexene-1, 1,3-butadiene and isoprene; and other vinyl compounds such as acrylonitrile, vinyl acetate, vinyl propionate, vinyl chloride and vinylidene chloride.

Still other monomers which are commonly employed in preparing pressure sensitive adhesives include the ethylenically unsaturated carboxylic acids such as acrylic acid, methacrylic acid, itaconic acid, fumaric acid, maleic acid, and the like. Also useful are the ethylenically unsaturated sulfonic acids such as 2-acrylamide-2-methylpropane sulfonic acid.

The polymers of this invention most advantageously have a minimum of 90 percent, preferably 95 percent and more preferably 97 percent by weight total polymer of sec-butyl acrylate and a maximum of 99.5 percent, preferably 99 percent and more preferably 97 percent by weight total polymer of sec-butyl acrylate.

The remainder portion of said polymer can comprise other monomers such as those listed above and more preferably the remainder portion is made up of the ethylenically unsaturated carboxylic acids. Even more preferred are monomers of itaconic and acrylic acid from about 0.5 to about 5 percent by weight total polymer.

The polymers are prepared using conventional emulsion polymerization techniques. For example, conventional initiators, solvents, emulsifiers, chain transfer agents, etc., are introduced along with the desired monomers into a temperature controlled reactor and agitator. The reaction is carried out in an oxygen-free environment for sufficient time to convert the monomers to polymer. The molecular weight of the polymer can vary. Generally, low molecular weight polymers of less than approximately 25,000 exhibit properties more similar to tackifiers than adhesives, i.e., high peel adhesion and low shear adhesion. Therefore, medium molecular weight polymers of approximately 25,000 to 500,000 and high molecular weight polymers to approximately 1,000,000 are preferred for preparing the present adhesives. However, low molecular weight polymers of sec-butyl acrylate can be advantageously admixed in place of tackifier or as a partial substitution therefor.

Whereas the polymeric composition as described above is suitable for use as an adhesive material, it is generally desirable to incorporate a tackifier resin. Thus, the pressure-sensitive adhesive of this invention can comprise the latex composition described above and a tackifying resin emulsion or tackifier. Tackifying resins useful in the preparation of the pressure sensitive adhesive are commercially available and are generally disclosed in U.S. Pat. No. 4,189,419 herein incorporated by reference. Typically the resins comprise emulsified resin, partially decarboxylated rosin, glycerol ester of polymerized rosin, partially dimerized rosin, natural resin, hydrogenated wood rosin, plasticized hydrogenated rosin, aliphatic hydrocarbon resins derived from petroleum, aromatic resins derived from petroleum, terpene resins, coal tar polyindene resins, ethylene vinyl acetate copolymer resins, terpene phenolics, coumarone-indenes, rosin esters, pentaerythritol esters, and polydicyclobutadiene resins. The properties of the adhesive composition can be varied for particular applications by the selection of an appropriate tackifying resin.

Naturally the particular tackifiers employed can contain conventional additives such as softeners, plasticizers, antioxidants, inert fillers and the like which can be emulsified along with the tackifying resin or emulsified separately and mixed with the tackifying resin emulsion.

Tackifiers are desirably added in an amount such that the latex is given additional tack (quick stick and peel adhesion) without detracting unduly from the shear adhesion. Suitable formulations will typically have about 1 to about 90 percent, preferably about 20 to about 80 percent, and most preferably from about 30 to about 50 percent tackifer by weight on a total solids basis in the formulation.

Typically the pressure-sensitive adhesive composition can be prepared by blending the desired amount of latex and tackifier in any conventional manner. It is understood that no requirement or limitation to the scope of the invention is intended as to how the latex and tackifier components are combined.

The compositions of the present invention may be used as the adhesive component in pressure sensitive tapes, films and foams. They adhere well to resin surfaces such as plasticized poly(vinyl chloride), Mylar ® brand polyester film, cellulose acetate, nylon, polyethylene and polypropylene, as well as to paper, metal and painted surfaces. They are especially useful as the adhesive component of decorative vinyl sheets, decals, vinyl foam and tiles.

Articles of manufacture such as tapes, decals, decorative vinyl sheets and transfer films containing the pressure sensitive resin composition of the present invention are prepared by coating the resin on the appropriate substrate by conventional coating methods. Such articles conventionally include a release paper for temporary protection of the adhesive film until the final adhesive bond is made. The thickness of the adhesive film is generally in the range of 5 to 125 microns.

Application of the film to the substrate is conventionally carried out on roll coaters such as reverse roll and gravure roll coaters. The resin emulsion viscosity is adjusted to between 25 and 5,000 centipoises with higher viscosities within the range preferred for reverse roll coating and lower viscosities within the range preferred for gravure coating. Typically, coatings are applied to the substrate moving through the rolls at a rate of between 3.05 meters per minute and 305 meters per minute.

While the present invention has been described with particular reference to certain specific embodiments thereof, it will be understood that certain changes, substitutions and modifications may be made therein without departing from the scope thereof. This invention also contemplates the use of fillers, extenders, stabilizers, antioxidants, plasticizers, tackifiers, flow control agents, adhesion promoters, dyes, etc. in the pressure sensitive resin emulsions and the pressure sensitive resins of this invention.

As mentioned earlier, the use of sec-butyl acrylate as the major component in a PSA provides exceptional adhesive properties when compared to other alkyl acrylate esters or conventional PSAs. In particular, sec-butyl acrylate PSAs characteristically have very good shear bond and good peel adhesion. Because shear and peel strengths are antagonistic properties, it is very desirable to formulate PSAs having peel strengths comparable to conventional PSAs while increasing shear strength.

EXAMPLE I

The adhesive properties of isomeric butyl acrylates including sec-butyl acrylate were measured at various tackifier levels. The basic polymer formulation consisted of 97 percent by weight total polymer of the isomeric-butyl acrylate and 3 percent by weight total polymer of acrylic acid. The tackifier employed was Hercules Picconal ® A600 E (a 55 percent non-volatile emulsion of hydrocarbon resins in water) and is shown in percent by weight on a total solids basis. The tests were conducted by coating adhesive paper with the formulated PSAs. PTSC Test Method No. 1 was employed to measure peel adhesion and PTSC Test Method No. 7 for shear adhesion.

TABLE I

| | Tackifier (Percent) | | | | | |
|---|---|---|---|---|---|---|
| | 0 | 9 | 23 | 34 | 44 | 53 |
| n-butyl acrylate | | | | | | |
| peel adhesion (gm/in) | 880 | 1025 | 1250 | 2100$^c$ | 2000$^c$ | 1800$^c$ |
| shear adhesion (min.) | 6115 | 3980 | 5701 | 384$^c$ | 16$^c$ | 6$^c$ |
| iso-butyl acrylate | | | | | | |
| peel adhesion (gm/in) | 1090 | 1160 | 1300 | 1420 | 1600 | 1850 |
| shear adhesion (min.) | 6111 | 1996 | 185 | 905 | 16 | 4 |
| sec-butyl acrylate | | | | | | |
| peel adhesion (gm/in) | 1350 | 1340 | 1450 | 1450 | 1725 | 1650 |
| shear adhesion (min.) | 6113 | 3985 | 4662 | 8539 | 5976 | 5331 |

$^c$cohesive failure (unacceptable, failure within adhesive).

The adhesive measurements from Table I demonstrate that adhesives prepared with sec-butyl acrylate exhibit the best combination of adhesive properties either neat or blended with tackifier. More pronounced is the excellent maintenance of shear adhesion at increasing levels of tackifier with respect to the comparative n-butyl and iso-butyl acrylates.

EXAMPLE II

The adhesive properties of a sec-butyl acrylate PSA were measured against commercially available acrylic emulsion polymers. The results are tabulated below in Table II. The PSAs were coated onto 2 mil Mylar ® with a #30 wire wound rod and tested according to PSTC Test Method No. 1 for peel adhesion and PSTC Test Method No. 7 for shear adhesion. No tackifier was added to the subject PSA which was a 97 percent sec-butyl acrylate by total weight polymer and 3 percent acrylic acid by total weight polymer. The commercial PSAs were tested without modification. Peel adhesion is shown in pounds per linear inch (pli) and shear adhesion in hours (hr).

TABLE II

| PSA | Peel Adhesion (pli) | Shear Adhesion (hr) |
|---|---|---|
| 97 sec-butyl acrylate and 3 acrylic acid | 3.0 | 1200 |
| Aroset ® 2020-W-50$^{(1)}$ | 2.8 | 122 |
| Aroset ® 2510-W-62$^{(1)}$ | 3.4 | 2 |
| Aroset ® 2520-W-60$^{(1)}$ | 2.6 | 5 |
| Rhoplex ® PS-83D$^{(2)}$ | 2.0 | 7 |
| Gelva ® 2424$^{(3)}$ | 2.4 | 16 |

$^{(1)}$Trademark of Ashland Oil, Inc., Columbus, OH, for high molecular weight acrylic emulsion polymer adhesives, 50 percent, 62 percent, and 60 percent total solids, respectively.
$^{(2)}$Trademark of Rohm & Haas Co., Philadelphia, PA, for acrylic emulsion polymer adhesives, 53 percent total solids.
$^{(3)}$Trademark of Monsanto Co., St. Louis, MO, for acrylic emulsion polymer adhesives, 65 percent total solids.

Table II shows that the 97 percent sec-butyl acrylate and 3 percent acrylic acid PSA was far superior in shear adhesion than the commercial acrylic emulsion PSAs and comparable with respect to peel adhesion.

EXAMPLE III

The following adhesive compositions were prepared and their adhesive properties measured. All percentages are by weight total polymer. The subject adhesive containing 97 percent sec-butyl acrylate, 3 percent acrylic acid having a $T_g$ of $-7.5°$ C. and a high molecular weight. Comparative adhesives containing 97 percent n-butyl acrylate, 3 percent acrylic acid having a $T_g$ of $-44.4°$ C. and a high molecular weight; 96 percent n-butyl acrylate, 4 percent itaconic acid having a $T_g$ of $-44°$ C and moderate molecular weight; and 62 percent n-butyl acrylate, 35 percent styrene and 3 percent acrylic acid having a $T_g$ of 10° C. and high molecular weight were prepared. The adhesive properties were measured as before and are recorded in Table III.

TABLE III

| Sample | PSA | Peel Adhesion (pli) | Shear Adhesion (hr) |
|---|---|---|---|
| 1 | 97 sec-butyl acrylate/ 3 acrylic acid | 3.1 | 1000.0 |
| 2 | 97 n-butyl acrylate/ 3 acrylic acid | 1.4 | 3 |
| 3 | 96 n-butyl acrylate/ 4 itaconic acid | 1.8 | 64 |
| 4 | 62 n-butyl acrylate/ 35 styrene/3 acrylic acid | 0.2$^j$ | 0 |

$^j$jumpy (discontinuous brittle failure of adhesive bond).

In this comparison, it was queried whether the high $T_g$ or high molecular weight of sec-butyl acrylate contributed to its good adhesive properties. Accordingly, Samples 2 and 3 which have high and moderate molecular weight respectively and similar $T_g$ were prepared. Neither sample outperformed the sec-butyl acrylate even though the $T_g$ was lower and molecular weight was approximately equal in one case and lower in the other. Next, Sample 4 was prepared to have a $T_g$ much higher than Samples 2 and 3 and close to the subject PSA (Sample 1) to see if this made it more competitive. Again, the results show that sec-butyl acrylate remained superior. This data indicates that the excellent adhesive properties of sec-butyl acrylate are not attributable to molecular weight or its high $T_g$. Therefore, sec-butyl acrylate is itself believed to be responsible for good adhesive properties.

What is claimed is:

1. An emulsion polymerized latex composition suitable for use as a pressure sensitive adhesive comprising: (a) from about 95 to about 97 percent by weight total polymer of sec-butyl acrylate and (b) from about 5 to about 3 percent by weight total polymer of acrylic acid.

2. The composition of claim 1 which additionally includes from about 1 to about 90 percent by weight on a total solids basis of a tackifying resin.

3. The composition of claim 2 where said tackifying resin is present from about 30 to about 50 percent by weight on a total solids basis.

* * * * *